United States Patent [19]

Spencer

[11] 4,013,126
[45] * Mar. 22, 1977

[54] HORSESHOE MANUFACTURE
[76] Inventor: Dudley W. C. Spencer, 619 Shipley Road, Wilmington, Del. 19801
[ * ] Notice: The portion of the term of this patent subsequent to Nov. 4, 1992, has been disclaimed.
[22] Filed: Sept. 18, 1975
[21] Appl. No.: 614,766

Related U.S. Application Data
[63] Continuation-in-part of Ser. No. 426,446, Dec. 20, 1973, Pat. No. 3,917,000, which is a continuation-in-part of Ser. No. 71,121, Sept. 10, 1970, Pat. No. 3,664,428, and Ser. No. 252,546, May 12, 1972, Pat. No. 3,782,473.

[52] U.S. Cl. .................................... 168/4; 168/17
[51] Int. Cl.² .......................................... A01L 3/00
[58] Field of Search ............ 168/DIG. 1, 4, 12, 13, 168/14, 17, 20

[56] References Cited
UNITED STATES PATENTS 2,768,458 10/1956 Anania ........................... 40/2 R X
3,917,000 11/1975 Spencer ................................. 168/4

Primary Examiner—Jack Q. Lever
Assistant Examiner—Peter K. Skiff
Attorney, Agent, or Firm—Connolly and Hutz

[57] ABSTRACT

Elongated strands are threaded through holes in a horse's hoof. The strands have substantial exposed air spaces into which adhesive may flow for facilitating securement of the shoe to the hoof by interaction with the adhesive upon the shoe. Additionally, or alternatively the strands may be used to assist in the medical treatment of cracks in the hoof.

11 Claims, 8 Drawing Figures

U.S. Patent          Mar. 22, 1977          4,013,126
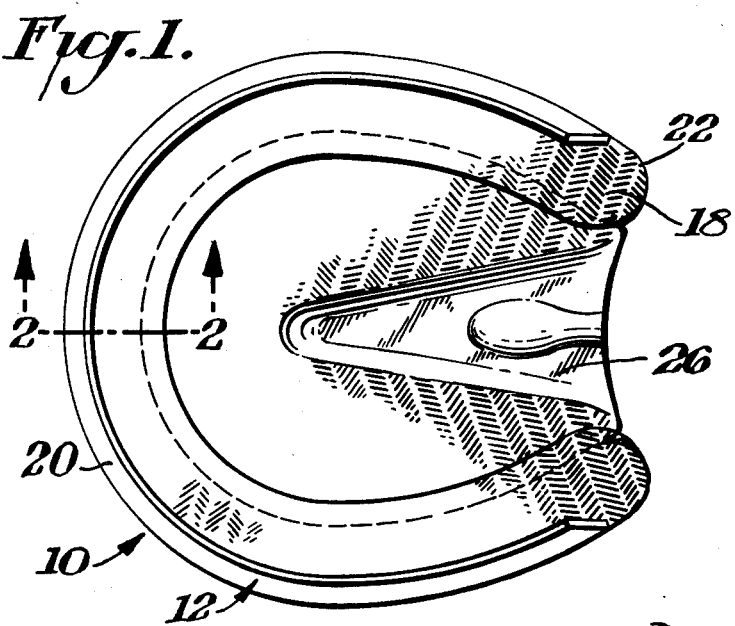
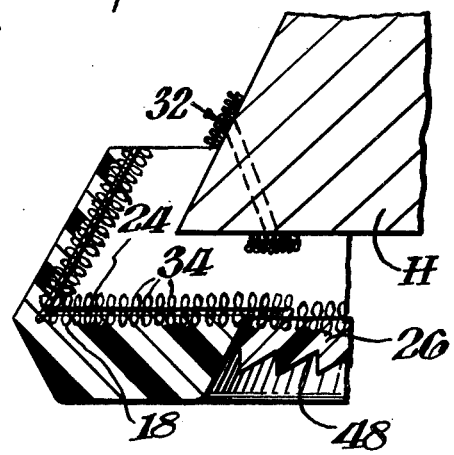
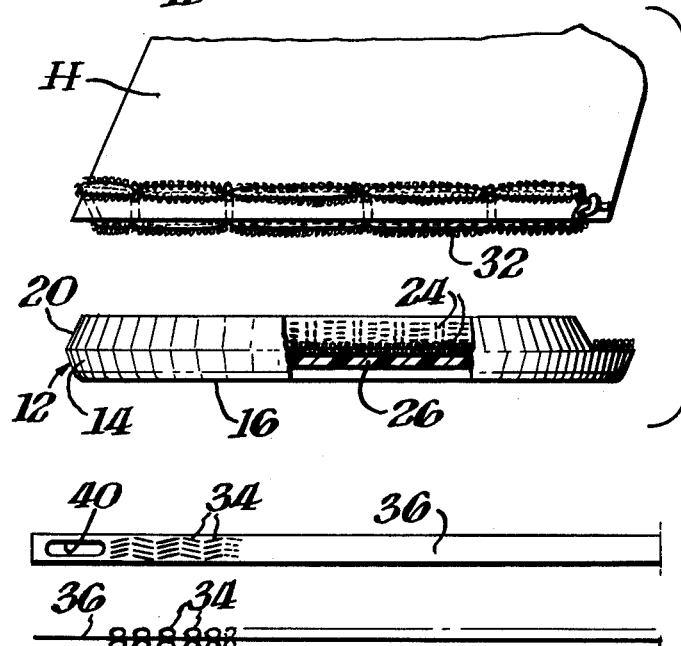
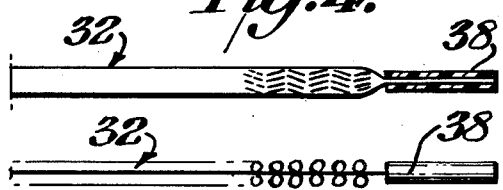
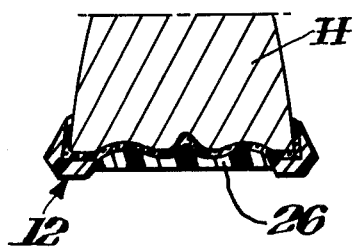
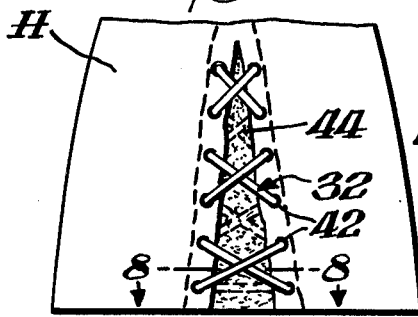
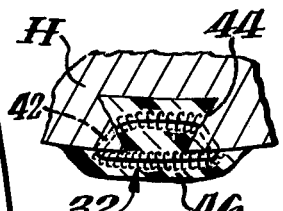

4,013,126

HORSESHOE MANUFACTURE

CROSS-REFERENCE TO RELATED APPLICATION

This application is a continuation-in-part of patent application Ser. No. 426,446; filed Dec. 20, 1973, now U.S. Pat. No. 3,917,000. The parent application in turn was a continuation-in-part of Ser. No. 71,121 filed Sept. 10, 1970, now U.S. Pat. No. 3,664,428 and Ser. No. 252,546 filed May 12, 1972, now U.S. Pat. No. 3,782,473.

BACKGROUND OF THE INVENTION

Parent application Ser. No. 426,446 filed Dec. 20, 1973, now U.S. Pat. No. 3,917,000, relates to improvements in the manufacture of horseshoes wherein elongated strands are threaded through holes in the horse's hoof and facilitate securement of a shoe to the hoof by being in direct contact with adhesive means on the shoe.

Parent application Ser. No. 426,446 now U.S. Pat. No. 3,917,000 also teaches the use of pad means on the upper surface of the shoe element with the pad means including an impermeable sheet which comprises a barrier for preventing the adhesive for contacting the shoe element directly through the pad means.

SUMMARY OF THE INVENTION

An object of this invention is to provide further refinements to the teachings disclosed in parent application Ser. No. 426,446, now U.S. Pat. No. 3,917,000.

In accordance with this invention the elongated strands are formed of an open material having substantial air spaces which are exposed. The air spaces may be formed by utilizing velcro formations on the strand. Alternatively, the strand may be formed with the individual filaments leaving air spaces between them.

In accordance with another aspect of this invention the pads on the upper surface of the shoe may be in the form of a continuous pad which covers both the top and side walls thereof.

In accordance with a further aspect of this invention the U-shaped shoe element may have a web portion completely covering the area between the legs and bight thereof so as to completely shield the entire sole area of the hoof.

In accordance with yet a further aspect of this invention the elongated strand may be used apart from securing a shoe to the hoof. In this respect the strand may be used similar to a suture which is threaded through opposite sides of a crack in the hoof into which adhesive has been applied to prevent the crack from being enlarged and thus to permit the healing operation to take place.

THE DRAWINGS

FIG. 1 is a top plan view of a horseshoe assembly in accordance with this invention;

FIG. 2 is a cross-sectional view taken through FIG. 1 along the line 2—2 and further illustrating the horse's hoof prior to attachment of the horseshoe assembly;

FIG. 3 is an exploded view of the assembly shown in FIG. 2;

FIG. 4 is a top plan view of an elongated strand in accordance with this invention;

FIG. 5 is a side view of the strand shown in FIG. 4;

FIG. 6 is an elevation view of a horseshoe assembly mounted on a hoof;

FIG. 7 is an elevation view of a hoof in accordance with a further aspect of this invention; and FIG. 8 is a cross-section view taken through FIG. 7 along the line 8—8.

DETAILED DESCRIPTION

This application incorporates by reference thereto the disclosures in the previously noted parent application and in the parent patents of that application. For the sake of simplicity the following description will be primarily directed to refinements of the disclosure in the parent application.

As illustrated in FIGS. 1–3 the horseshoe assembly 10 includes a shoe element 12 made of any suitable material such as adiprine having a body member 14 with a lower wear surface 16 and an upper securing surface 18. Upstanding wall portions 20 such as a continuous wall or wall segments extend from the bottom member for being disposed against the lower surface of the horse's hoof H. Shoe element 12 is generally U-shaped with a pair of free ends 22, 22.

As disclosed in the parent application a sheet member or pad is provided on the shoe element. In accordance with this invention the pad means is a single sheet 24 which is applied to both the upstanding wall portions 20 and the upper securing surface 18 and also extends slightly beyond and overhangs the upper securing surface 18 in the open area between the legs and bight portion of the U-shaped shoe element 12. As disclosed in the parent application, sheet 24 likewise includes mechanical anchoring means or projections such as the loops or hooks formed when a velcro material is used. It is to be understood, however, that this invention is not intended to be limited to that specific material. Thus various materials such as disclosed in column 2 of parent U.S. Pat. No. 3,917,000 including Corfam (registered trademark of E.I. du Pont de Nemours & Co.) and other polymerics may be used in the practice of the invention.

For purposes later described the horseshoe assembly 10 also includes a web portion 26 which may be made of the same type material as pad 24 and which engages the overhanging portions of pad 24 to completely span the otherwise open space between the legs and bight of U-shaped element 12.

Horseshoe assembly 10 further includes elongated flexible strands or cords 32 made generally similar to conventional shoe laces. Strands 32, however, are made of an open material, that is of a material having substantial air spaces. Such suitable material may, for example, be velcro having exposed loops or projections 34 on each side of a base layer 36. Other suitable materials include, for example, non-ferrous materials such as nylon, cotton and Kevlar, wherein the individual filaments are spaced from each other to create a plurality of exposed openings or interstices. At least one end of the strand includes at its tip a hardened rigid formation 38 such as made from acrylic or metal similar to a conventional shoe lace to facilitate the manipulation of the strand.

In accordance with this invention the strand 32 is also provided with an opening at one end thereof to facilitate securement of the strand to the hoof. If a hardened rigid formation 38 is included at both ends of the strand it is not important which end has the opening. Where, however, only a single hardened formation 38 is provided the opening is located at the opposite end of the strand. When fabric such as loosely woven, knit or braided cotton is used with the open spaces formed by interstices in the strand itself, these interstices may themselves be used as the opening. Where, however, a material such as velcro is used a slit 40 is formed therein to provide the aforementioned opening.

As described in the parent application holes are formed in the horse's hoof and the strand is threaded through the holes with the hardened formation or tip 38 used for manipulation until the strand has been completely threaded therethrough. Tip 38 is then inserted through hole 40 or any other opening at the opposite end of the strand for securement of the strand to the hoof.

As previously indicated velcro is a particularly suitable material for the strand. In this respect the velcro loops have a tendency to retain their shape and not be crushed thereby assuring the proper open formation of the strand. This open formation is utilized so that adhesive material placed on the shoe element may flow into the strand openings to facilitate securement of the shoe element to the hoof. Any suitable adhesive may be used including conventional room temperature curing adhesives which might have the individual components mixed together in situ.

FIGS. 7–8 illustrate a further ramification of this invention which utilizes the concept of threading an elongated strand through holes formed in the hoof. As indicated therein, this ramification is particularly used for repairing cracks in the hoof such as quarter crack repairing. In the illustrated embodiment holes 42 are formed on each side of the crack 44. The crack is completely filled with a suitable adhesive 46. Strand 32 is threaded through the holes 42 and the adhesive flows into its openings to thereby prevent the crack from enlarging. During the healing process the adhesive would be forced out of the crack and periodically trimmed from the hoof until the crack is completely healed by which time all of the adhesive and strand material would have been generally removed from the crack area.

As previously indicated in accordance with one aspect of this invention a web or pad 26 spans the legs and bight portion of U-shaped element 12. This web 26 would likewise be formed of a material such as velcro which is compatible with the pad means 24 as, for example, by the loops in both velcro pads interacting whereby the entire sole area of the hoof is covered. Such a pad or web 26 is particularly desirable to prevent the shoe element from spreading and thus provides the necessary rigidity thereto which is sometimes required with, for example, race horses. A further advantage of the web 26 is to protect the sole area from damage such as which occur by stepping on sharp material as, for example, gravel, etc. Pad 26 may be provided with a roughened or irregular lower surface 48 to provide a gripping surface.

A still further advantage of incorporating pad 26 in the horseshoe assembly 10 is as an aid in treating an injured hoof. Thus, for example, a medicament could be applied to the sole area and the provision of the pad would assure that the medicament remains in that area rather than being rubbed off if the sole were exposed. In the preferred form of this invention the velcro formation would extend over the entire upper surface of pad or web 26 so that the loops or hooks provide advantageous means for retaining the medicament. After the sole area is healed the pad can be conveniently removed by simply cutting it from its engagement with pad means 24 without the necessity of removing the entire shoe. If desired pad or web 26 may be molded to conform to the sole contour of the hoof and thus would have a non-planar upper surface.

Pad or web 26 may be secured to the overhanging portions of pad 24 in a number of alternative ways. For example adhesive may be applied to the underside of the overhanging portions and also to the upper surface of web 26 with the loops or hooks on the pad and web providing convenient anchoring means and then the web 26 may be adhesively secured to pad 24. Alternatively, web 26 may be mechanically engaged to pad 24 by means of the velcro formations on web 26 engaging the velcro formations on pad means 24. This alternative has the advantage that a web may be easily removed, for example, when fresh medicament is to be applied and then reattached without the necessity of cutting the overhanging portion of pad means 24.

Both the pad means 24 and the web 26 a well as strand 32 may have loops on both sides of each element or hooks on both sides of each element or loops on one side and hooks on the other side. Further strand 32 may have the velcro formation entirely omitted from one side thereof, namely, the inner side since such velcro formation is necessary only for the side thereof disposed toward pad means 24.

What is claimed is:

1. A horseshoe assembly comprising a shoe element, said shoe element having a body member with a lower wear surface and an upper securing surface, said shoe element being generally U-shaped to conform to the shape of a hoof, adhesive means on said shoe element, hoof-threading means for being threaded through holes in a hoof of a horse, said hoof-threading means including an elongated strand made of a flexible lace-type material for being in direct contact with said adhesive means to thereby secure said assembly to the hoof, and said strand being formed of an open material having a substantial number of exposed air spaces whereby the adhesive means may flow into said air spaces for intimate securement of said assembly to the hoof.

2. An assembly as set forth in claim 1 wherein at least one end of said strand has a hard rigid formation at its tip to facilitate the manipulation of said strand.

3. An assembly as set forth in claim 2 wherein said strand includes at least one opening at its end remote from said hard rigid formation of a size sufficiently large to permit said hard rigid formation to be inserted therethrough.

4. An assembly as set forth in claim 1 wherein said strand is made of velcro having a base sheet with loops on each side thereof, and said loops comprising said air spaces.

5. An assembly as set forth in claim 4 wherein at least one end of said strand has a hard rigid formation at its tip thereof to facilitate the manipulation of said strand.

6. An assembly as set forth in claim 5 wherein the end of said strand opposite said hard rigid formation includes a slit in said base sheet of a size sufficient to permit said hard rigid formation to be inserted therethrough.

7. An assembly as set forth in claim 1 wherein said strand is made of a non-ferrous material, and said adhesive means being room temperature curing.

8. An assembly as set forth in claim 1 wherein said shoe element includes a peripheral wall portion, pad means secured to said peripheral wall portion and said upper securing surface on one side thereof and secured to said adhesive means on the other side thereof, and said pad means including a sheet which extends from said peripheral wall portion and onto said upper securing surface.

9. An assembly as set forth in claim 8 wherein said sheet is made of a polymeric material.

10. A horseshoe assembly comprising a shoe element, said shoe element having a body member with a lower wear surface and an upper securing surface, said shoe element being generally U-shaped, said shoe element having an upstanding peripheral side wall, said shoe element being made of a plastic material, pad means connected to upper securing surface of said shoe element and to the inner surface of said peripheral side wall, adhesive means secured to said pad means on the side thereof remote from said shoe element for securing said assembly to the hoof, said pad means including an impermeable sheet which comprises barrier means for preventing said adhesive from contacting said shoe element directly through said pad means, and said sheet being a single continuous sheet which extends from said peripheral side wall and onto said upper securing surface.

11. An assembly as set forth in claim 10 wherein said sheet is made of a polymeric material.

* * * * *